May 30, 1933.  D. E. SILCOX  1,911,853
APPARATUS FOR MEASURING GASES
Filed Dec. 27, 1927  4 Sheets-Sheet 4

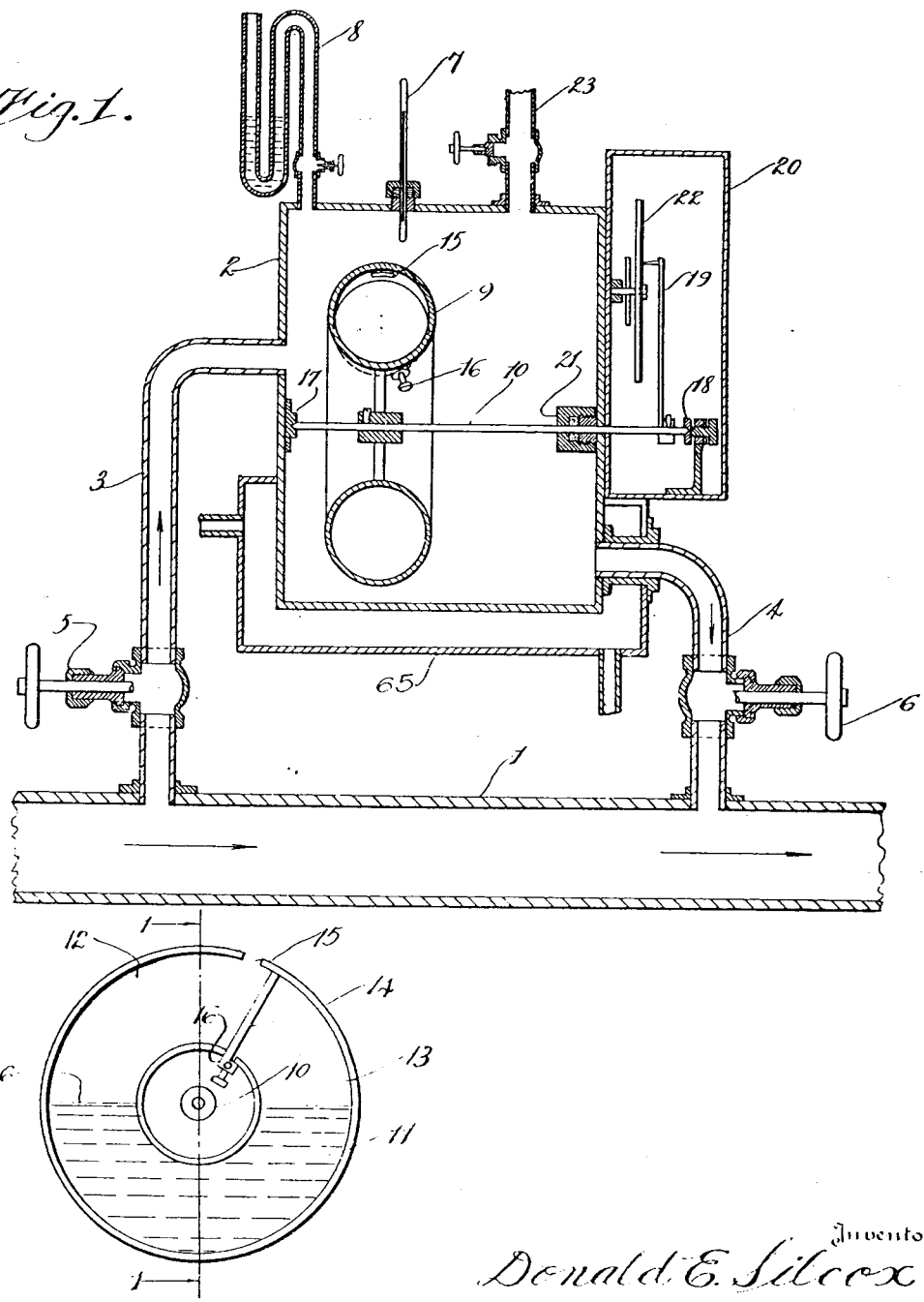

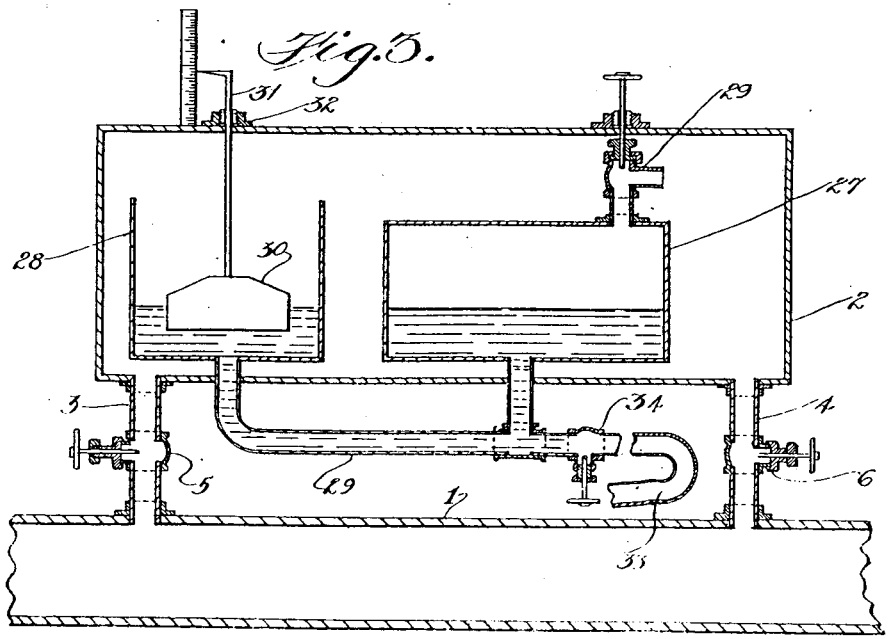
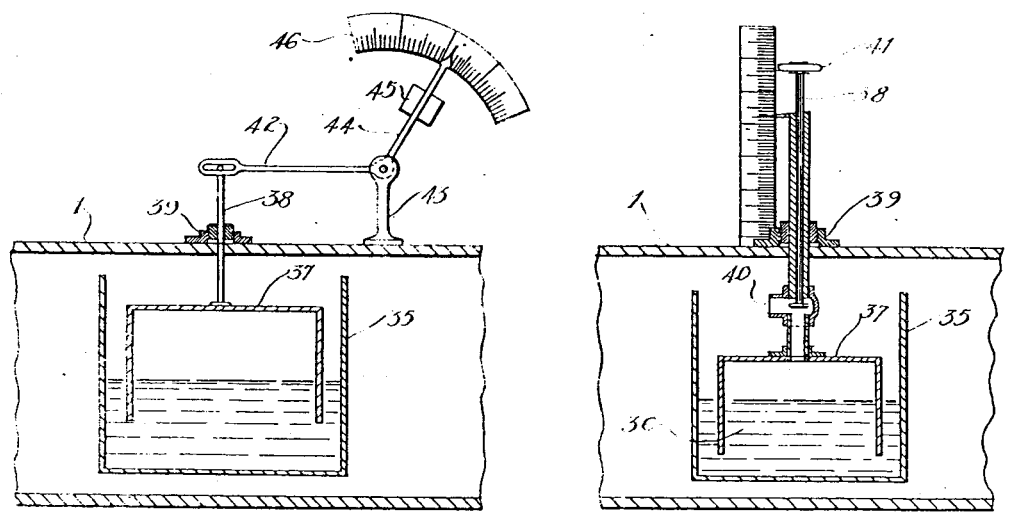

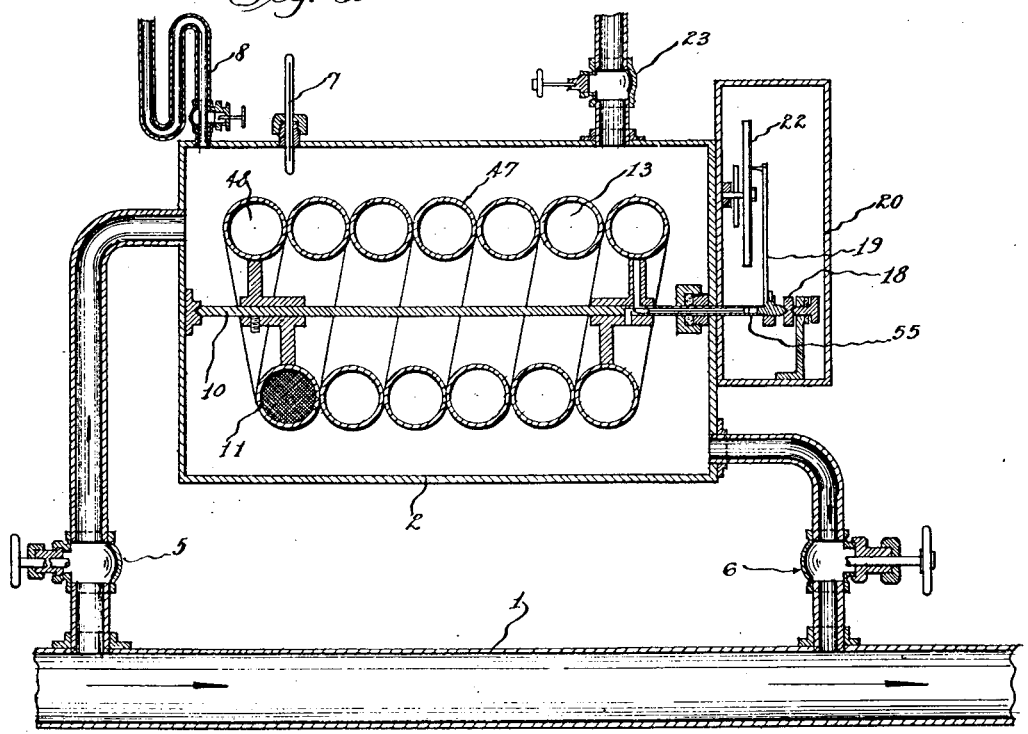
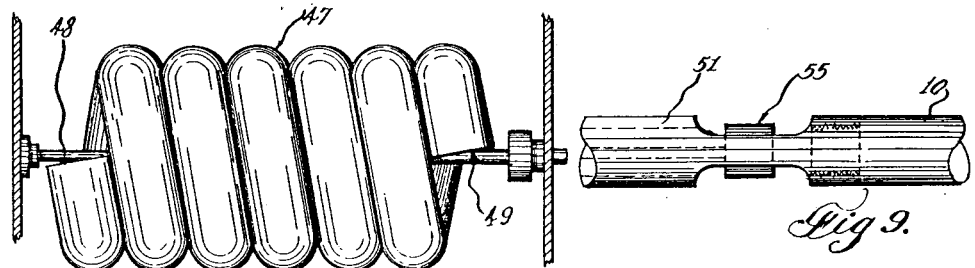
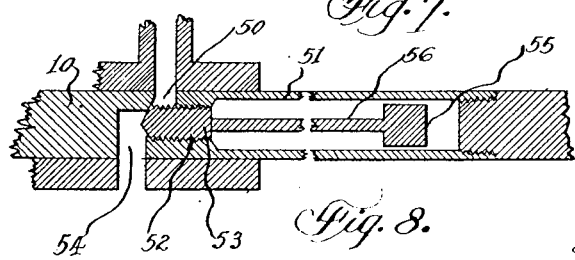

Inventor
Donald E. Silcox
By Lyon & Lyon
Attorneys

Patented May 30, 1933

1,911,853

UNITED STATES PATENT OFFICE

DONALD E. SILCOX, OF TAFT, CALIFORNIA, ASSIGNOR TO STANDARD OIL COMPANY OF CALIFORNIA, OF SAN FRANCISCO, CALIFORNIA, A CORPORATION OF DELAWARE

APPARATUS FOR MEASURING GASES

Application filed December 27, 1927. Serial No. 242,925.

This invention relates to devices for the measurement of gases. Inasmuch as the volume of a gas varies with temperature and pressure it is customary in the measurement of gases to assume some arbitrary condition of temperature and pressure as standard, and to convert all measured volumes under other temperatures and pressures into equivalent volumes at standard conditions. In the natural gas industry for instance, the standard unit of measurement is usually the cubic foot at a pressure of 14.65 pounds per square inch, and at a temperature of 60° F.

Natural gas is rarely metered under standard conditions, hence for accurate measurement with present equipment it is necessary to know the compressibility of the gas being measured. The compressibility of the gas is the relation between a unit volume under standard conditions and the space occupied by the same unit under any other conditions of pressure and temperature. Present types of measuring devices for gases such as orifice meters, Venturi meters and displacement meters indicate the rate of flow of the actual volumes of gas passing through under existing conditions of pressure and temperature and in addition record concurrently the actual pressure and temperature of the gas during the measurement. With this data it is customary to convert the indicated volumes to equivalent volumes under standard conditions by the use of complicated formulas based on the laws of Charles and Boyle in which the volume of a gas changes in the same ratio as its absolute temperature and inversely as its pressure.

Such formulas require the use of pressure gauges and thermometers to determine the variables in lengthy computations, and the results are unsatisfactory due to inaccuracies in the physical laws as applied to the particular gases being measured. The laws of Charles and Boyle are correctly applicable only to theoretically perfect gases and as practically all commercial gases do not come under this classification, the results obtained by using the laws of Charles and Boyle may be considered as approximate only. To determine the true volume of a gas measured by any of the various types of meters used it would be necessary to conduct tedious and costly laboratory experiments on samples of gas, to determine the effect of variations in pressure and temperature on volume. In this way, providing the samples are representative of the entire body of gas being measured, the true compressibility of the gas may be determined and correction factors developed to apply to the computed volumes, for obtaining true equivalent volumes under standard conditions. If the character of the gas changes during measurement the correction factors previously determined will be unsatisfactory, requiring a repetition of the laboratory work on new samples of gas to establish new constants.

An object of this invention is to provide an apparatus by means of which volume changes of a gas may be readily determined.

An object is to disclose a device for determining the volume changes of a portion of a gas being concurrently measured for total volume.

Another object is to disclose a device which will automatically record or indicate the volume relations between a gas at standard temperature and pressure conditions and a varying temperature condition while said gas is concurrently measured for total volume at such varying temperature.

Another object is to provide a simpler and more accurate means than is now available for converting volumes of gases as indicated by a meter, into corresponding volumes under standard conditions of pressure and temperature.

I have discovered a means of overcoming the difficulties encountered in present methods of measuring gases, by which the compressibility of the gas under working conditions of pressure and temperature is automatically recorded or compensated for. In accordance with my invention, this is accomplished by trapping a sample of the gas being metered and observing its volume under standard conditions of pressure and temperature. The sample is then connected with the gas supply and thus subjected to the pressure and temperature existing in the main body of gas, and the variations in volume recorded concurrently with the volume passing through the meter. The relation between the recorded volume of the sample and its observed volume under standard conditions will then be the same as the relation between the volume passing through the meter and its equivalent volume under standard conditions.

Thus the known inaccuracies of the laws governing the effect of pressure and temperature on the volume of commercial gases are avoided and the actual variations of volume are recorded automatically by the sample of gas trapped. In this way a correction factor may be obtained for directly converting the measured volume as shown by a suitable meter into equivalent volume under standard conditions and the observance of temperature and pressure during the measurement may be dispensed with. The correction factor may be obtained directly from the calibration of the mechanical, electrical or other device used to record the changes in volume of the representative sample or the apparatus may be calibrated in actual volumes, percentages of original volume or other units. The formulas are not only simplified but the accuracy of the results is improved without recourse to laboratory tests; furthermore in the event of change in the character of the gas affecting its compressibility it is necessary only to trap a new sample in the recording device.

In its preferred embodiment, the invention is an apparatus for use in conjunction with a meter of any known type by which volumes of gas are measured, and the invention will be readily understood from descriptions of the apparatus illustrated in the accompanying drawings which represent diagrammatically several alternative arrangements for carrying out the invention.

Figure 1 is a vertical section of one preferred form of my invention.

Figure 2 is a transverse section of the pressure tube employed in the device shown in Figure 1.

Figures 3, 4 and 5 are vertical sections of alternative forms of my apparatus.

Figure 6 is a vertical section of one modification of the apparatus similar in operation to that disclosed in Figure 1.

Figure 7 is a plan view of the tube employed in Figure 6, and

Figures 8 and 9 refer to details of construction of the apparatus.

Figure 10:
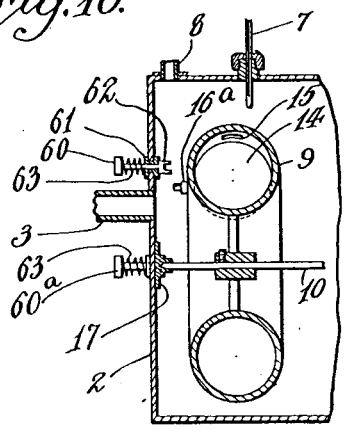

Figure 10 is a vertical section of one portion of apparatus of the type shown in Figure 1 illustrating a modified form of means for admitting a fluid into the device.

Figure 11:
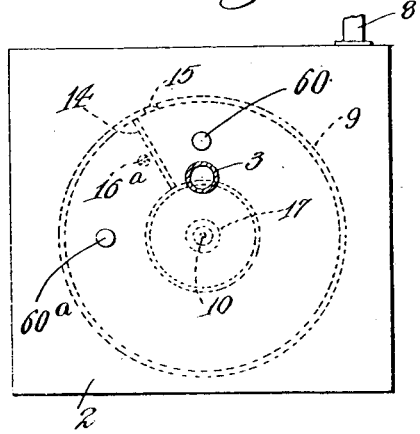

Figure 11 is an elevation of the apparatus shown in Figure 10.

Figure 12:
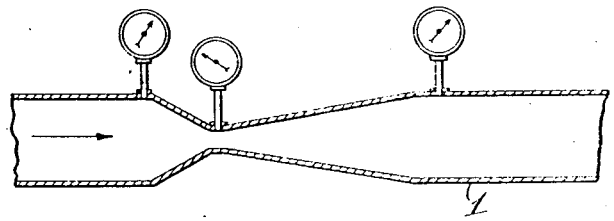

Figure 12 is a diagrammatic representation of a Venturi meter for measuring the flow of fluids.

Referring to the drawings, Figure 1 represents a preferred arrangement in which 1 is a gas line or main carrying the gas which is being concurrently measured by a meter of displacement, orifice, Venturi or any other suitable type, for example, a Venturi meter of the type diagrammatically illustrated in Fig. 12. A housing 2 is connected to the gas line 1 by pipe means 3 and 4, the flow of gas to such housing from the gas line 1 being controlled by valves 5 and 6 whereby a portion of the gas passing through the gas line 1 may be by-passed through the housing 2. In this way, the interior of the housing 2 may be maintained at the same temperature and pressure that exists in the gas line 1. Communicating with the interior of the housing 2 is a temperature recording or indicating means 7 and a pressure recording or indicating means 8, such as a barometer or water or mercury manometer.

Within the housing 2 there is a pressure tube 9 preferably in the form of an annular tube rigidly attached to a horizontal shaft 10 and arranged so as to rotate with the shaft 10 as an axis. The lower portion of the tube 9 is filled with a suitable liquid sealing means such as mercury 11 and the upper part is divided into two compartments 12 and 13 by means of a radial partition 14. The compartment 12 is exposed to the condition of pressure and temperature existing in the housing 2 by reason of the intercommunicating opening 15. Gas may be admitted to the compartment 13 by means of a suitable valve and opening 16.

The shaft 10 turns on practically frictionless bearings 17 and 18 and its motion is transmitted to an indicator arm 19 attached to the shaft within an exterior compartment 20. Leakage of gas from the housing 2 is prevented by a stuffing gland 21 of suitable design. The movement of the indicating arm 19 is transcribed to a chart 22 which is revolved or otherwise moved by any suitable mechanism so as to give a continuous record over a period of time.

In operation, a liquid sealing medium such as mercury is placed in the annular tube 9, through the opening 15, and to the level of the axis of the shaft 10. The housing 2 is then allowed to fill with the gas being measured and passing through the gas line 1 by opening valves 5 and 6 and allowing said gas to fill the housing 2. Valves 5 and 6 are then closed and the contents of the housing 2 brought as closely as possible to standard temperature and pressure conditions, excess pressure within the housing 2 being liberated by means of a valved outlet 23, while the temperature within the housing is modified by either heating or cooling the housing by applying heat or cooling means exteriorly thereof, as by passing a heating or cooling fluid through the partial housing 65 surrounding the housing 2. The tube 9 which has been rotated until the compartment 13 is entirely filled with mercury is then turned in the opposite direction so as to fill the compartment 13 with a desired amount of the gas through the valve 16. Valve 16 is then manually closed and temperature and pressure conditions within the housing 2 again brought to the standard conditions used as the basis of measurement and such minor adjustments made on the indicator 19 so that if the gas flowing in the gas line 1 were brought to exactly standard conditions of pressure and temperature, the reading would be correct.

Another method of admitting gas to chamber 13 would be to position the valve 16ᵃ near the exterior wall of chamber 2 as shown in Figs. 10 and 11 so that it could be operated from the outside by means of a sliding stem 60 passing through the wall. Under these conditions a stuffing box 61 around such stem prevents the escape of gas and the inner end of the stem is provided with a fork 62 or other engaging member adapted to engage with and operate valve 16ᵃ or a part thereof. Two of such stems 60 and 60ᵃ may be used, one properly placed for filling and the other for bleeding the valve to obtain the proper zero reading, the annular chamber being revolved by hand, if desired, from the recording chamber so that the valve 16ᵃ be brought to proper location for adjustment as described. Springs 63 may be provided as shown in the drawings for maintaining the stems 60 and 60ᵃ and forks out of engagement with the valve 16ᵃ.

The valve structure illustrated in Figures 6 to 9 may be applied to the apparatus shown in Figures 1 and 2.

Valves 5 and 6 are opened allowing the pressure and temperature in the line 1 to act on the tube 9. Line pressure enters the opening 15, and acts on the surface of the mercury 26 and on the partition 14. As the mercury tends to remain level by reason of gravity, there will be a condition of unequal pressure on either side of the partition 14 which imparts a rotary movement to the tube 9 until the pressure on each side of the partition 14 becomes equalized. Variations in temperature affecting the volume of the entrapped sample will likewise be indicated by rotation of the tube 9.

Thus any changes in the volume of the gas in compartment 13 will be reflected by corresponding rotation of tube 9 and movement of indicator 19 so that at any time during the measurement, the relation of the volume of gas metered under working conditions to the equivalent volume under standard conditions of pressure and temperature will be known and indicated.

It is evident that an apparatus strictly in accordance with Fig. 2 would be slightly unbalanced because of the weight of partition 14 and valve 16 on one side of the vertical center line.

While the arrangement shown in Fig. 1 and Fig. 2 is a preferred form, it is understood that the principles involved may be carried out in many different ways such as the alternative methods hereinafter described. Referring to Figure 3, the gas line 1 is connected to a housing 2 by pipe means 3 and 4 having valves 5 and 6 therein. Within the housing 2 there is placed a substantially closed chamber 27 and an open chamber 28. The bottom of these chambers is connected by pipe means 29 containing mercury or other suitable sealing liquid. Means for admitting gas from the housing 2 into the container 27 by means of an externally operated valve 29 are provided. The open chamber 28 contains a float 30 bearing a vertical indicator 31 which passes through a suitable stuffing gland 32 so as to prevent the escape of gas from the housing 2. The chamber 27 is filled with mercury by means of a tube 33 connected to the tube 29 through a valve 34, complete filling of the chamber 27 being indicated by the position of the indicator 31 at its highest point. Gas from the gas line 1 is then admitted to the housing 2 by temporarily opening valves 5 and 6 and then closing said valves. Temperature and pressure conditions within the housing 2 are then so regulated as to very closely approximate standard conditions and valve 29 is then opened, the chamber 27 being filled with a suitable quantity of gas by discharging the mercury through tube 33 by opening valve 34 and then closing said valve when a suitable amount of gas has been admitted into the chamber 27. Valve 29 is then closed and the housing 2 again brought to standard temperature and pressure conditions. The indicator 31 is then adjusted so as to indicate this condition and valves 5 and 6 open so as to by-pass gas from the main 1 through the housing 2 thereby applying the pressure of the gas in the line 1 to the surface of the mercury in the float chamber 28. The application of this pressure to the surface of the liquid in the float chamber causes a movement of liquid through the tube 29 and affecting the volume of the gas in chamber 27 thereby. The variations of volume of the chamber 28 will affect the position of the float 30 and will be indicated by the indicator 31. The temperature of the gas admitted from the main 1 will likewise affect the volume of the gas within the chamber 27 and be noted by the indicator 31. Any difference of the level of the liquid in the chamber 27 and the float chamber 28 will affect the indicated volume, and a correction should be made in calibrating the indicator 31 so as to contract this unbalanced weight of the liquid in the two chambers.

In Fig. 4, there is shown a modified form of my apparatus placed within the gas line 1. This apparatus comprises an open chamber or container 35 containing mercury or other suitable liquid 36. An inverted chamber 37 is placed within the outer container 35, vertical movement of said chamber being indicated by means of a valve stem and indicator rod 38 which passes through the pipe line through a stuffing gland or packing ring 39. The valve 40 is opened by turning the handle 41 and the chamber 37 is then depressed by movement of the indicator and valve stem 38 so as to pull all of the gas contained within the chamber 37 and filling said chamber with liquid or mercury 36. The chamber 37 is then raised admitting gas from the line 1 through valve 40. When the desired volume of gas is thus trapped in the chamber, the valve 40 is closed by movement of the handle 41. The volume of the gas trapped within the chamber 37 is then determined under standard temperature and pressure conditions (as by shutting off line 1 at each side of the apparatus and reducing the space thus defined to standard pressure and temperature conditions) and thereafter subjected to the flow of gas in the line 1 which acts upon the surface of the mercury between the outer container 35 and the inverted inner container 37, thereby causing a movement of the indicator 38. During calibration of this device within the pipe 1, the flow of gas through said pipe line may be diverted.

The apparatus shown in Figure 5 is similar to that shown in Figure 4. In Figure 5 the indicator stem 38 passes through a stuffing gland 39 and transmits its vertical motion by means of a connecting rod 42 and a pivot 43 to an indicator 44 which is counterbalanced by the weight 45 so that the effect of buoyancy of the chamber 37 will be equalized. This arrangement simplifies the calibration of the gauge 46. Gas may be admitted into chamber 37 by raising the chamber until its lower edges are free of the liquid seal, thereby allowing the gas to fill the chamber. When the chamber 37 is allowed to drop, it will assume a floating position upon the liquid seal.

A still further embodiment of my invention is shown in Figures 6 to 9. This form of apparatus utilizes a helical or spiral tube 47 mounted upon a shaft 10, enabling a much larger volume of gas to be trapped without increasing the outer diameter of the tube. This modification of my apparatus greatly increases the sensitivity. For example, if the space 13 in Fig. 2 were filled with gas at 14 lbs. per square inch absolute, and the pressure in the line is 300 lbs. per square inch, then the volume of trapped gas in chamber 13 will be compressed to a volume less than one-twentieth of the original volume. Variations in temperature and pressure would be more difficult to measure. However, if the tube is coiled as shown in Figs. 6 and 7, it may be made say ten times as long, allowing a sample of ten times the volume to be trapped so that for a given temperature or pressure variation the movement of the recording or indicating pointer would be ten times as large. A sufficient quantity of liquid sealing means such as mercury 11 is placed in the coil 47 to seal off one ring. One end of the coil 47 is open as shown at 48 while the other is closed as shown at 49. The interior of the coil near its closed end communicates with a port 50 in the shaft 10. This shaft 10 is hollow for a part of its length as indicated at 51 and threaded interiorly as at 52 to accommodate a valve 53 which is adapted to close the port 50 or bring it into communication with port 54 which communicates with the interior of chamber 2. The hollow portion of the shaft 51 passes through a suitable gland and into the recording instrument chamber 20. A portion of said hollow shaft is opened in the chamber 20 so as to expose the knurled capstan head 55 mounted on shaft 56 which is a part of the valve 53.

By opening valve 53 by manipulation of the knurled capstan head 55 in chamber 20, the chamber near the closed end 49 of coil 47 is placed in communication with the interior of chamber 2 through ports 50 and 54. The coil 47 is then revolved by turning the shaft in the chamber 20 and the mercury made to follow the spirals until it reaches the closed end of the chamber and all of the gas has been expelled. Chamber 2 may then be filled with gas from line 1 by opening valves 5 and 6 and then, by reversing the direction of turning, the mercury may be brought back to substantially its original position, drawing in a charge of gas into the coil 47. This charge of gas is then trapped by closing valve 53 by means of capstan head 55 and the apparatus is ready for calibration and operation in the manner previously described.

While the various types of apparatus herein described are well adapted to carry out the objects of the present invention, it is apparent that various modifications and changes may be made without departing from the spirit of the invention and it is understood that the invention includes all such modifications and changes as come within the scope of the following appended claims.

I claim:

1. In an apparatus for measuring gases, the combination of a housing, an annular container provided with an open end and a closed end rotatably mounted on a shaft within said housing, said annular container being provided with an opening near said closed end, a valve for said opening, liquid sealing means in said container whereby said liquid sealing means is exposed to fluid within said housing, and means operably connected to said shaft and annular container for indicating and recording the rotation of said container.

2. An apparatus for measuring fluids, comprising a conduit for a flowing stream of fluid, a housing, a valved pipe means adapted to admit fluid from said conduit into said housing, a movable container provided with an opening therein positioned within said housing, means for admitting a fluid into said container, liquid means for preventing escape of fluid from said container into said housing, said liquid means being exposed to fluid within said housing, and means for indicating movement of said container.

3. An apparatus for measuring fluids, comprising a housing, means for permitting circulation of a fluid through said housing, a convoluted movable container provided with one open end positioned within said housing, means for admitting a fluid into said container, liquid sealing means within said container for preventing escape of fluid from said container, said liquid sealing means being exposed to fluid within said housing, and means operably connected to said container for indicating movement of said container.

4. An apparatus for measuring volume, temperature and pressure relationship of gases, comprising a housing, means for permitting circulation of a fluid through said housing, a convoluted movable container provided with an open end positioned within said housing, means for admitting a fluid into said convoluted container and retaining said fluid within said container, a liquid means within a portion of said convoluted container for preventing escape of fluid therefrom, said liquid means being exposed to fluid within said housing through said open end of said container, and means operably connected with said container and extending beyond said housing for indicating movement of said container.

5. An apparatus for measuring fluids, comprising a housing, valved means for admitting a fluid into said housing, a helical container of more than one turn rotatably mounted within said housing upon an axis through the center of gravity of said container, means for admitting a fluid into said container, liquid sealing means in a portion of said container for preventing escape of fluid therefrom, said container having one open end whereby said liquid sealing means is exposed to fluid within said housing, and means operably connected to said container for indicating movement of said container.

6. In an apparatus for measuring fluids, the combination of a housing, means for regulating the temperature in said housing, a container movably positioned in said housing, means for admitting gas to said container, liquid sealing means for retaining gas in said container, means for regulating the passage of fluid through said housing, and means operably connected to said container for indicating movement thereof caused by volume changes of gas retained in said container.

7. An apparatus for measuring gases, comprising a housing through which gas may be passed, an annular container rotatably mounted on a shaft in said housing, a partition in said container, said annular container being provided with a port on one side of said partition and an adjacent valved port on the other side of said partition, liquid sealing means in the lower portion of said container between said valved port and other port and out of contact with said partition, and means operably connected to said container and shaft for indicating and recording rotation thereof.

8. An apparatus for measuring gases, comprising a housing, means for admitting gas into said housing, means for controlling the temperature of gas within said housing, an annular container rotatably mounted in said housing, a partition in said container, said annular container being provided with a pair of adjacent openings one on each side of said partition, a valve for one of said openings, liquid sealing means in said container between said openings and out of contact with said partition, and means operably connected to said container for indicating and recording rotation thereof.

9. An apparatus for measuring gases, comprising a conduit for a flowing stream of gas, a housing, valved pipe means connecting said housing with said conduit to permit gas therefrom to circulate through said housing, a movable container provided with one open end and positioned in said housing, means for admitting a gas into the closed end of said container, a liquid seal in said container and exposed to gas in said housing through said open container end whereby gas trapped therein may expand, and means operably connected to said container and actuated by expansion of gas trapped in said container for indicating changes in volume of gas in said container.

10. An apparatus for measuring gases, comprising a conduit for a flowing stream of gas, a housing, valved pipe means connecting said housing with said conduit to permit gas therefrom to circulate through said housing, a movable container provided with an open end and a closed end and positioned in said housing, said movable container being provided with an opening near said closed end, a valve for said opening, a liquid seal in said container and exposed to gas in said housing through said open container end, whereby gas trapped therein may expand, means operably connected to said container and actuated by expansion of gas trapped in said container for indicating changes of volume of gas in said container, means for changing the temperature in said housing, and valved means for relieving fluid pressure from said housing.

11. An apparatus for measuring volume temperature and pressure relationship of gases, comprising a movable container having a chamber of variable volume, said container being provided with a liquid seal for trapping gas within the variable volume chamber of said container, a separate means for admitting gas to said variable volume chamber of said container, means actuated by change in volume of gas within said variable chamber of said container for recording the volume of said gas at a standard temperature and pressure, and means for subjecting said container and gas confined therein to a different temperature and pressure.

12. An apparatus for measuring volume temperature and pressure relationship of gases comprising a housing, a movable container in said housing, said container being provided with a liquid seal exposed to gas within the housing, said container being adapted to receive and yieldingly confine the gas, means whereby the pressure in the housing may be reduced, means for maintaining the contents of said housing at the temperature and pressure of gas to be metered, and indicating and recording means operably connected to said movable container extending through said housing and actuated by movement of said container due to changes in volume of gas trapped in said container.

Signed at Taft, California, this 21 day of October, 1927.

DONALD E. SILCOX.